March 27, 1945. C. R. STEWART 2,372,456
CHECK VALVE
Filed March 13, 1944
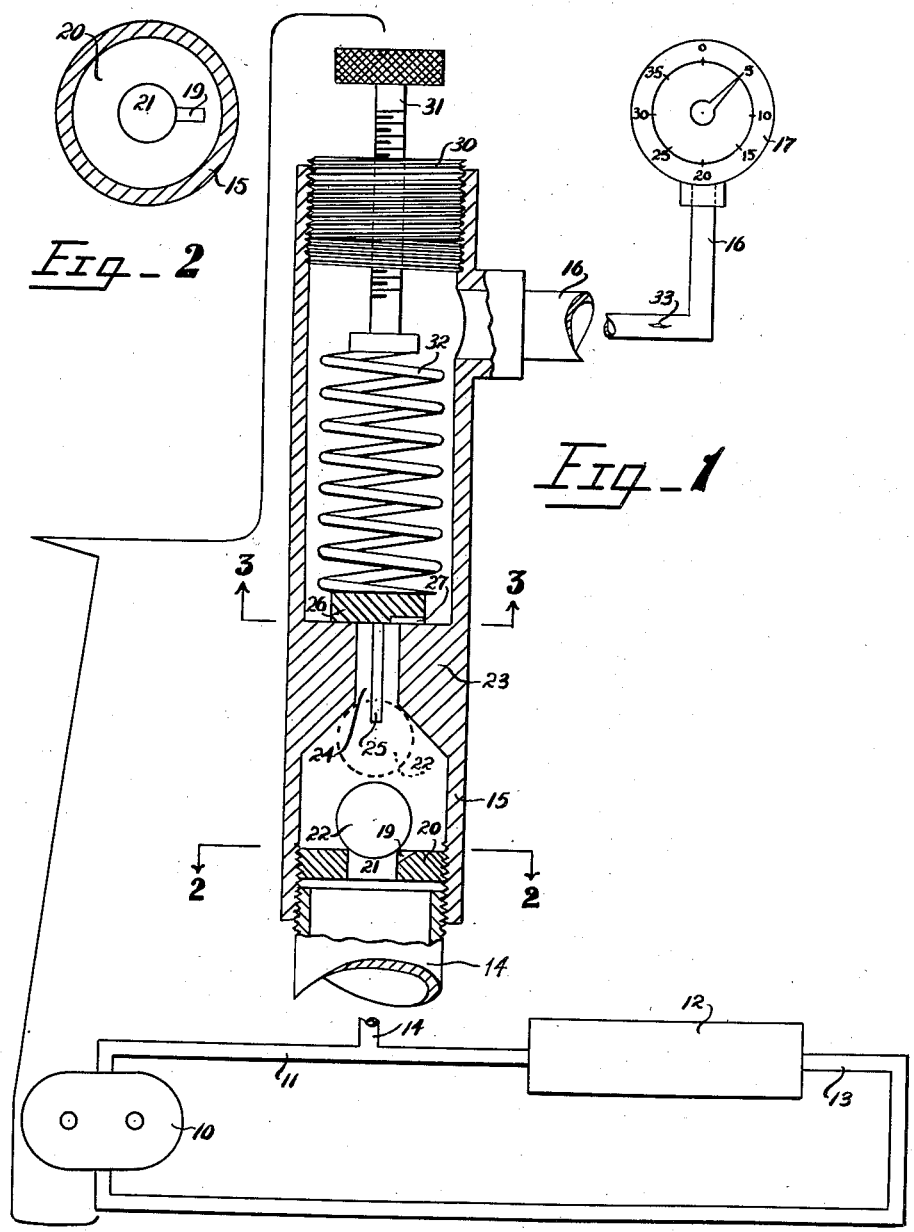
Inventor:
Charles R. Stewart
By
Paul B Eaton
Attorney Patented Mar. 27, 1945

2,372,456

UNITED STATES PATENT OFFICE 2,372,456

CHECK VALVE

Charles R. Stewart, Charlotte, N. C.

Application March 13, 1944, Serial No. 526,146

4 Claims. (Cl. 137—69)

This invention relates to a check valve for use in pressure systems and more especially to a valve which allows a passage of liquid therethrough to a gauge and the like when the system is under pressure, but when a break occurs in the line beyond the valve, the increased flow of fluid through the line in which this valve is located will cause the valve to automatically close and upon the break being repaired, or the flow of fluid through the break being stopped, the valve will automatically return to normal position.

In oil pressure systems for internal combustion engines, as for example, an automobile engine, there is a branch line running from the lubrication system to an oil pressure gauge usually located on the instrument board. If the pipe leading from the pressure system to the gauge should become broken, very soon all of the oil within the system will flow out through the broken line, resulting in drainage of the system and in great damage to the motor. This valve is also adaptable to pipes leading to steam gauges from a steam pressure system, or it can be used in pipe lines and the like where a constant flow of liquid or fluid through the line would be permitted, but in the event of lessening of the pressure on one end of the line, the rate of flow of the fluid through the valve would be greatly increased, thus causing the fluid itself to automatically move the valve to closed position and upon shutting off of the break by repairing the same or closing a valve in the system to stop the flow of the fluid out of the broken line, the valve would return to normal position. The valve is also equally adaptable in fluid pressure brake systems, such as hydraulic brake systems where a valve like this could be installed in each line leading to a wheel of an automotive vehicle so that in the event of a breaking of the line leading to a particular wheel, the loss of fluid through this break would be prevented.

It is therefore an object of this invention to provide a valve adapted to be disposed in a fluid pressure line which allows for fluctuations of pressure and allows the fluid to flow through the valve in both directions in limited quantities, but in the event of a breakage in the line beyond the valve or on the remote side of the valve from the source of fluid pressure, the valve will be automatically closed to prevent loss of fluid and when the break has been repaired or the flow of fluid stopped, the valve will automatically return to normal position.

Some of the objects of the invention having been stated, other objects will appear as the description proceeds, when taken in connection with the accompanying drawing, in which:

Figure 1 is a schematic elevational view with parts thereof in vertical section showing my valve on a greatly enlarged scale applied to a fluid pressure system;

Figure 2 is a transverse sectional view taken along the line 2—2 in Figure 1;

Figure 3 is a transverse sectional view looking upward, and taken along the line 3—3 in Figure 1.

Referring more specifically to the drawing, the numeral 10 indicates a suitable fluid pump having leading from the output side thereof a pipe 11 which leads through a system such as an internal combustion engine 12 for lubricating the same, and leading from the other side of the system 12 is a return pipe 13 which returns to the intake side of the pump 10. Branching off from the pipe 11 or the pipe 13, as it makes no difference whether this invention is applied on one side of the system 12 or the other, is a branch pipe 14 which has connected thereto the valve housing 15. This valve housing has connected thereto a pipe 16 which leads to a suitable pressure gauge 17. The valve housing 15 has a disk 20 threadably secured in its lower end which has an opening 21 disposed centrally thereof on top of which rests a ball 22. The disk 20 is slotted as at 19 to allow a restricted flow of fluid past the ball 22.

Intermediate the ends of the valve housing 15, there is a constricted portion 23 having a passageway 24 therethrough. Disposed in the passageway 24 is a valve stem 25 which has a valve head 26 on its upper end which rests on top and closes the passageway 24 were it not for a groove 27 cut in the lower face of the valve head 26. This allows fluid to flow in both directions past the valve head 26 in a limited quantity when it is in seated position. The upper end of the valve housing 15 is closed by a plug 30 threadably mounted in the upper end of the valve housing 15 and in this plug is threadably mounted a screw 31, the lower end of which fits against a compression spring 32 whose lower end rests on top of the valve head 26. By adjusting the position of screw 31, pressure on valve head 26 can be adjusted.

In operation with no break in the line 16 beyond the valve housing 15, the fluid pressure in the valve housing 15 is substantially the same as in the pipe 11 and system 12, and in this condition, the parts occupy a position shown in full lines in Figure 1. Now when a break 33 occurs in the pipe 16 disposed beyond the valve housing 15, the sudden rush of fluid will force the ball 22 to dotted line position in Figure 1, and this will lift valve head 26 with its steam 25 and allow the fluid to rush out of the valve housing for a very short time until the ball 22 becomes seated in the dotted line position shown in Figure 1, which will effectively seal the passageway 24, and will prevent any further passage of liquid or fluid out through the pipe 16. After the fluid pressure has been relieved in the pipe 14, or restored in pipe 16, the parts will return to normal position, so that when the break in the line 16 is repaired, the valve will operate normally without it being necessary to dismantle the valve or reset the parts.

The valve 26 being pressed by a spring 32 and having the leak channel 27, allows a limited amount of fluid to pass through valve 26 if this valve were used in a system where there is a constant flow. Where a check valve is used in a system leading to a pressure gauge for operation on an internal combustion engine when the engine stops, the oil drains back into the crank case, but when the engine is started, the oil under pressure is forced through the passageway at 19 and 27 to the gauge and the passageway 27 limits the volume of oil flowing so that there will not be enough volume to raise the check ball 22 with sufficient force to strike pin 25 to dislodge valve 26 against its spring pressure. But if a break occurs in line 16 or in the pressure gauge then sufficient flow through leak 27 would be permitted to cause ball 22 to strike pin 25 to raise valve 26 as there would be no appreciable pressure in line 16.

In the drawing and specification, there has been set forth a preferred embodiment of the invention, and although specific terms are employed, they are used in a generic and descriptive sense only and not for purposes of limitation, the scope of the invention being defined in the claims.

I claim:

1. A check valve for fluid pressure lines comprising a ball check valve normally seated by gravity and a poppet valve normally seated by a spring, said valves having leak passages for allowing fluid in small amounts to leak by said valves, a sudden lowering of pressure in the side of the line remote from the source of fluid pressure causing lifting of the ball to open the poppet valve, and a seat below the poppet valve into which the flowing fluid will force the ball to stop flow of fluid by the poppet valve.

2. In a check valve for fluid pressure lines, a valve housing having a pair of spaced, restricted passageways therein, a valve mounted in each passageway and each passageway having a restricted by-pass for fluid associated therewith, resilient means for holding at least one of the valves in closed position, a lowering of pressure in the pressure line on the side of the valve housing remote from the source of pressure causing the differential in pressure to open one valve to strike the other valve to open it, and a seat into which the first valve enters by the flow of fluid to stop further flow of fluid to the low pressure side of the valve housing.

3. A check valve for fluid pressure lines having means for permitting a restricted flow of fluid therethrough, means operable by a substantially greater flow of fluid for a short period when a break occurs in the line on the side of the valve remote from the source of pressure for opening the valve and for automatically stopping all flow of fluid through the valve, and spring means for automatically returning the valve to normal position when pressure is equalized on both sides of the valve.

4. A check valve for fluid pressure lines having a pair of valves provided with restricted passageways for permitting a restricted flow of fluid thereby, a substantially greater flow of fluid for a short period when a break occurs in the line on the side of the valves remote from the source of pressure causing opening of the valves, one of the valves, when moved a predetermined distance by the increased flow of fluid causing a stopping of all flow of fluid past the valves.

CHARLES R. STEWART.